United States Patent [19]

Lazarowitz et al.

[11] Patent Number: 5,725,470
[45] Date of Patent: Mar. 10, 1998

[54] PROCESS FOR SOIL REMEDIATION

[75] Inventors: Virginia L. Lazarowitz, Hatfield, Pa.; Allen D. Urfer, Plainfield, Ind.; George A. Smith, Newton, Pa.

[73] Assignee: Henkel Corporation, Plymouth Meeting, Pa.

[21] Appl. No.: 858,411

[22] Filed: May 19, 1997

Related U.S. Application Data

[63] Continuation of Ser. No. 588,582, Jan. 18, 1996.

[51] Int. Cl.$^6$ .................................................. A62D 3/00
[52] U.S. Cl. ...................... 588/249; 134/25.1; 405/128; 210/747
[58] Field of Search .......................... 405/128, 129, 405/258, 263–266; 588/249, 255, 256, 206, 207, 205; 106/900; 252/137; 134/25.1, 10; 208/13; 210/610, 747, 751

[56] References Cited

U.S. PATENT DOCUMENTS

| | | | |
|---|---|---|---|
| 1,985,424 | 12/1934 | Piggott | 260/124 |
| 2,965,576 | 12/1960 | Wilson | 252/137 |
| 5,086,717 | 2/1992 | McCrossan | 110/346 |
| 5,096,600 | 3/1992 | Hoch | 405/128 X |
| 5,194,639 | 3/1993 | Connor et al. | 554/66 |
| 5,195,847 | 3/1993 | Guymon | 208/13 X |
| 5,266,690 | 11/1993 | McCurry, Jr. et al. | 536/18.6 |
| 5,334,764 | 8/1994 | Scheibel et al. | 564/487 |
| 5,374,361 | 12/1994 | Chan | 507/211 |
| 5,425,881 | 6/1995 | Szejtli et al. | 210/747 |
| 5,454,878 | 10/1995 | Bala et al. | 134/25.1 X |
| 5,502,267 | 3/1996 | Aubert | 588/250 |

*Primary Examiner*—Dennis L. Taylor
*Attorney, Agent, or Firm*—Wayne C. Jaeschke; John E. Drach; Steven J. Trzaska

[57] ABSTRACT

A process for the remediation of soil containing volatile organic compounds which comprises the steps of: (1) forming an emulsifier comprising: (a) from about 70 to about 99% by weight of a sugar surfactant selected from the group consisting of an alkyl polyglycoside, a glucamide, and mixtures thereof; and (b) from about 1 to about 30% by weight of a nonionic surfactant, other than said sugar surfactant which, when combined with said sugar surfactant, provides a hydrophilic-lipophilic balance of from about 8.0 to about 13.0; (2) mixing said emulsifier with said unwanted contaminants to form a stable emulsion; and (3) removing said stable emulsion from said soil.

20 Claims, No Drawings

PROCESS FOR SOIL REMEDIATION

This application is a continuation of application Ser. No. 08/588,582 filed on Jan. 18, 1996.

FIELD OF THE INVENTION

The present invention generally relates to a process for soil remediation. More particularly, the present invention provides a process for emulsifying and subsequently removing soil contaminants by combining them with a mixture of an alkyl polyglycoside and fatty alcohol having from 12 to 14 carbon atoms.

BACKGROUND OF THE INVENTION

Soil can become contaminated by volatile organic compounds (VOC's) in a variety of ways. Leaking fuel tanks and pipelines, either above ground or below, frequently contaminate soil with gasoline or diesel fuel. Underground tanks and pipelines can be particularly prone to leaks as they may have been in use for many years and, because they are buried in the soil, a slow leak may go undetected for some period of time. Industrial waste discharge and industrial accidents may also contribute to contamination of soil by VOC's.

Regardless of the source of contaminating VOC's, concern for the purity of groundwater and the environment generally has given rise to the need for methods and systems for removing the contaminating VOC's from soil. Thermal stripping of VOC's from soil by heating the soil to some temperature below the combustion temperature of the VOC's has been utilized in a variety of systems. These types of systems typically are designed to handle relatively low volumes of soil, however, and ultimately depend on relatively expensive techniques of capturing and disposing of the VOC's once they have been isolated from the soil, such as carbon filtration or afterburners.

Also, it is oftentimes highly desirable to first place these soil contaminants into some sort of inert and easily capturable form. This allows for both the prevention and/or slowing of unwanted contaminants into uncontaminated soil, in the event of an accidental spill, and for ease in removal and disposal once the contaminants have been isolated.

It is therefore a primary object of this invention to provide an efficient, high volume and stable process for isolating contaminants in contaminated soil.

Moreover, while various techniques currently exist for isolating contaminants in soil, these techniques are not always environment-friendly. Thus, another object of this invention is to provide a process which utilizes chemicals deemed to be both biodegradable and environment-friendly.

SUMMARY OF THE INVENTION

Other than in the operating examples, or where otherwise indicated, all number expressing quantities of ingredients or reaction conditions used herein are to be understood as being modified in all instances by the term "about".

The foregoing and other related objects are achieved, and the disadvantages obviated, by the surprising finding that a highly stable emulsion is formed by mixing an emulsifier based on a sugar surfactant and a nonionic surfactant, and then mixing the emulsifier with a contaminant to form a stable emulsion which is easily removed from the contaminated area by conventional means.

Accordingly, the present invention is directed to a process for remediating soil containing unwanted contaminants which involves the steps of: (1) forming an emulsifier containing (a) from about 70 to about 99% by weight of a sugar surfactant selected from the group consisting of an alkyl polyglycoside having the general formula I:

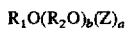

$$R_1O(R_2O)_b(Z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6, a glucamide having the general formula II:

$$\underset{R_4-C-N-Y}{\overset{O \quad R_3}{\underset{\|\quad|}{}}} \qquad (II)$$

wherein $R_3$ is H, $C_1$–$C_4$ hydrocarbyl, 2-hydroxy ethyl, 2-hydroxy propyl, or a mixture thereof, preferably $C_1$–$C_4$ alkyl, more preferably $C_1$ or $C_2$ alkyl, most preferably $C_1$ alkyl (i.e., methyl); and $R_4$ is a $C_5$–$C_{31}$ hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Y is a polyhydroxyhydrocarbyl moiety having a linear hydrocarbyl chain with at least 3 hydroxyls directly connected to the chain, or an alkoxylated derivative (preferably ethoxylated or propoxylated) thereof, and mixtures thereof; and (b) from about 1 to about 30% by weight of a nonionic surfactant, other than the above-identified sugar surfactant which, when combined with the sugar surfactant, provides an emulsifier having a hydrophilic-lipophilic balance of from about 8.0 to about 13.0; (2) mixing the emulsifier with an unwanted contaminant to form a stable emulsion having a hydrophilic-lipophilic balance of about 10; and (3) removing the stable emulsion from the soil.

DESCRIPTION OF THE INVENTION

The alkyl polyglycosides which can be used in the process of the invention to form the emulsifier are of general formula I:

$$R_1O(R_2O)_b(Z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. GLUCOPON® 225 Surfactant—an alkyl polyglycoside in which the alkyl group contains 8 to 10 carbon atoms and having an average degree of polymerization of 1.7.
2. GLUCOPON® 425 Surfactant—an alkyl polyglycoside in which the alkyl group contains 8 to 16 carbon atoms and having an average degree of polymerization of 1.55.
3. GLUCOPON® 625 Surfactant—an alkyl polyglycoside in which the alkyl groups contains 12 to 16 carbon atoms and having an average degree of polymerization of 1.6.

4. APG® 325 Surfactant—an alkyl polyglycoside in which the alkyl groups contains 9 to 11 carbon atoms and having an average degree of polymerization of 1.6.
5. GLUCOPON® 600 Surfactant—an alkyl polyglycoside in which the alkyl groups contains 12 to 16 carbon atoms and having an average degree of polymerization of 1.4.
6. PLANTAREN® 2000 Surfactant—a $C_{8-16}$ alkyl polyglycoside in which the alkyl group contains 8 to 16 carbon atoms and having an average degree of polymerization of 1.4.
7. PLANTAREN® 1300 Surfactant—a $C_{12-16}$ alkyl polyglycoside in which the alkyl groups contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

Other alkyl polyglycosides which can be used in the compositions according to the invention are those in which the alkyl moiety contains from 6 to 18 carbon atoms in which and the average carbon chain length of the composition is from about 9 to about 14 comprising a mixture of two or more of at least binary components of alkylpolyglycosides, wherein each binary component is present in the mixture in relation to its average carbon chain length in an amount effective to provide the surfactant composition with the average carbon chain length of about 9 to about 14 and wherein at least one, or both binary components, comprise a Flory distribution of polyglycosides derived from an acid-catalyzed reaction of an alcohol containing 6–20 carbon atoms and a suitable saccharide from which excess alcohol has been separated.

A particularly preferred alkyl polyglycoside for use in the present process is of general formula I wherein $R_1$ is a monovalent organic radical having from 8 to 16 carbon atoms; b is zero; and a is a number having a value of 1.55.

The glucamides which can be used in the process of the invention to form the emulsifier are of general formula (II):

wherein: $R_3$ is H, $C_1$–$C_4$ hydrocarbyl, 2-hydroxy ethyl, 2-hydroxy propyl, or a mixture thereof, preferably $C_1$–$C_4$ alkyl, more preferably $C_1$ or $C_2$ alkyl, most preferably $C_1$ alkyl (i.e., methyl); and $R_4$ is a $C_5$–$C_{31}$ hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Y is a polyhydroxyhydrocarbyl moiety having a linear hydrocarbyl chain with at least 3 hydroxyls directly connected to the chain, or an alkoxylated derivative (preferably ethoxylated or propoxylated) thereof. Y preferably will be derived from a reducing sugar in a reductive amination reaction; more preferably Y is a glycidyl moiety. Suitable reducing sugars include glucose, fructose, maltose, lactose, galactose, mannose, and xylose. As raw materials, high dextrose corn syrup, high fructose corn syrup, and high maltose corn syrup can be utilized as well as the individual sugars listed above. These corn syrups may yield a mix of sugar components for Y. It should be understood that it is by no means intended to exclude other suitable raw materials. Y preferably will be selected from the group consisting of —$CH_2$—$(CHOH)_n$—$CH_2OH$, —$CH(CH_2OH)$—$(CHOH)_{n-1}$—$CH_2OH$, —$CH_2$—$(CHOH)_2(CHOR')(CHOH)$—$CH_2OH$, where n is an integer from 3 to 5, inclusive, and R' is H or a cyclic mono- or polysaccharide, and alkoxylated derivatives thereof. Most preferred are glycidyls wherein n is 4, particularly —$CH_2$—$(CHOH)_4$—$CH_2OH$. Therefore, when, for example, $R_3$ is methyl, $R_4$ dodecyl; and Y is —$CH_2$—$(CHOH)_4$—$CH_2OH$, the compound in question is referred to as dodecyl N-methylglucamide.

Methods for making glucamides (polyhydroxy fatty acid amides) are known in the art. In general, polyhydroxy fatty acid amides can be made by reductively aminating a reducing sugar reacting with an alkyl amine to form a corresponding N-alkyl polyhydroxyamine and then reacting the N-alkyl polyhydroxyamine with a fatty aliphatic ester or triglyceride to form the N-alkyl, polyhydroxy fatty acid amide. Processes for making polyhydroxy fatty acid amides are disclosed in U.S. Pat. Nos. 1,985,424; 2,965,576; 5,194,639; and 5,334,764 the entire contents of each of which is incorporated herein by reference.

The nonionic surfactants, other than the above-identified sugar surfactants, which are suitable for making the emulsifier used in the present invention are those having a hydrophilic-lipophilic balance of from about 4.0 to about 8.0. Examples of which include, but are not limited to, fatty alcohols having from about 12 to about 14 carbon atoms, monoglycerides, sorbitan monoleates, ethoxylated linear alcohols, block copolymers of propylene oxide and ethylene oxide, sorbitan trioleates, sorbitan tristearates, nonylphenol ethoxylates, sorbitan monostearates, POE (2) stearyl alcohol, POE (2) oleyl alcohol, diethylene glycol monooleate, diethylene glycol monostearate, methyl glucoside dioleate, glycerol monostearate, diethylene glycol monolaurate, tetraglyceryl monooleate, tetraglyceryl monostearate, polyethylene glycol oleyl ether, polyethylene glycol alkyl ether, sorbitan monopalmitate, and calcium dodecyl benzene sulfonate.

According to one embodiment of the invention, the emulsifier is prepared by mixing from about 70 to about 99% by weight, and preferably about 80% by weight, of the sugar surfactant with from about 1 to about 30% by weight, and preferably about 20% by weight, of the above-disclosed nonionic surfactant, to form an emulsifier having an HLB of from about 8 to about 13, and preferably about 10.

Once the emulsifier is formulated, it is then mixed with the contaminants in the soil, including water, to form a highly stable emulsion characterized by the emulsion having an HLB value of from about 10.4 to about 10.8, and preferably 10.6, thus rendering it highly stable.

Examples of the types of contaminants on which the process of the present invention can be used include, but are not limited to, water-insoluble hydrocarbon containing contaminants such as diesel fuel, pesticides, and the like.

With respect to the particulars as to the equipment and methods used to physically retrieve the contaminants after they have been emulsified, the prior art is replete with information regarding its accomplishment. For example, U.S. Pat. No. 5,086,717 to McCrossan, incorporated herein by reference, represents merely one example of the state of the art in terms of apparatus and method which may be used to physically remove and dispose of the emulsified contaminants formed by the present process. Any other suitable apparatus and method may similarly be employed.

The present invention will be better understood from the examples which follow, all of which are intended to be illustrative only and not meant to unduly limit the scope of the invention. Unless otherwise indicated, percentages are on a wt-% actives basis.

EXAMPLE 1

An emulsifier was prepared having the following formulation:

| Component | % by weight |
|---|---|
| (a) GLUCOPON ® 225 (100% actives) | 87.5 |
| (b) LOROL ® 1214 A* | 12.5 |
| | 100.0 |

*A blend of $C_{12}$ and $C_{14}$ fatty alcohols in a wt-% breakdown of 65–75% $C_{12}$ fatty alcohols, 22–28% $C_{14}$ fatty alcohols, and the balance $C_{10}$, $C_{15}$, and $C_{18}$ fatty alcohols.

EXAMPLE 2

An emulsifier was prepared as in Example 1 having the following formulation:

| Component | % by weight |
|---|---|
| (a) GLUCOPON ® 225 | 70 |
| (b) LOROL ® 1214 A | 30 |
| | 100 |

EXAMPLE 3

An emulsifier was prepared as in Example 1 having the following formulation:

| Component | % by weight |
|---|---|
| (a) GLUCOPON ® 600 | 70 |
| (b) ALFONIC ® 1412-40* | 30 |
| | 100 |

The emulsifiers formed in Examples 1–3 were then mixed with various types of VOC contaminants to form emulsions. The stability of these emulsions was then tested by mixing, in separate 100 ml graduated cylinders, a 2% aqueous diesel fuel solution containing synthetic sea water, and a sufficient amount of the emulsifiers of Examples 1–3 to form 4% total actives solutions of each test sample. The graduated cylinders were then inverted 50 times to form an emulsion and allowed to stand at room temperature. The contents were then checked periodically for separation of the diesel fuel from the emulsion at varying temperatures. Table 1 summarizes the formulations and stability results.

| Ex. | Contaminant | %/wt soln. | HLB | stability @ room temp. | stability @ 140° F. |
|---|---|---|---|---|---|
| 1 | diesel fuel | 2% | 10.45 | stable >6 hrs. | stable >6 hrs. |
| 2 | diesel fuel | 2% | 10.45 | stable >6 hrs. | stable >6 hrs. |
| 3 | diesel fuel | 2% | 10.45 | stable >6 hrs. | stable >6 hrs. |

Thus, it can be seen from the results obtained above that emulsions formed by employing the emulsifiers of the present invention are stable over a significant temperature ranged allowing for the retrieval of contaminants such as diesel fuel in a safe and economical manner.

What is claimed is:

1. A process for the remediation of soil containing volatile organic compounds which comprises the steps of:
   (1) forming an emulsifier comprising:
      (a) from about 70 to about 99% by weight of a sugar surfactant selected from the group consisting of an alkyl polyglycoside having the general formula I:

$$R_1O(R_2O)_b(Z)_a \qquad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6, a glucamide having the general formula II:

(II)

wherein $R_3$ is H, $C_1$–$C_4$ hydrocarbyl, 2-hydroxy ethyl, 2-hydroxy propyl, or a mixture thereof, and $R_4$ is a $C_5$–$C_{31}$ hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof, and mixtures thereof: and
      (b) from about 1 to about 30% by weight of a nonionic surfactant, other than said sugar surfactant which, when combined with said sugar surfactant, provides a hydrophilic-lipophilic balance of from about 8.0 to about 13.0;
   (2) mixing said emulsifier with said unwanted contaminants to form a stable emulsion; and
   (3) removing said stable emulsion from said soil.

2. The process of claim 1 wherein said sugar surfactant is said alkyl polyglycoside of formula I.

3. The process of claim 2 wherein in formula I of said alkyl polyglycoside, $R_1$ is a monovalent organic radical having from 8 to 16 carbon atoms, b is zero, and a has a value of 1.55.

4. The process of claim 1 wherein said sugar surfactant is said glucamide of formula II.

5. The process of claim 1 wherein said nonionic surfactant is selected from the group consisting of fatty alcohols having from about 12 to about 14 carbon atoms, monoglycerides, sorbitan monooleates, ethoxylated linear alcohols, block copolymers of propylene oxide and ethylene oxide, sorbitan trioleates, sorbitan tristearates, nonylphenol ethoxylates, sorbitan monostearates, POE (2) stearyl alcohol, POE (2) oleyl alcohol, diethylene glycol monooleate, diethylene glycol monostearate, methyl glucoside dioleate, glycerol monostearate, diethylene glycol monolaurate, tetraglyceryl monooleate, tetraglyceryl monostearate, polyethylene glycol oleyl ether, polyethylene glycol alkyl ether, sorbitan monopalmitate, and calcium dodecyl benzene sulfonate, and mixtures thereof.

6. The process of claim 5 wherein said nonionic surfactant is said fatty alcohols having from about 12 to about 14 carbon atoms.

7. The process of claim 1 wherein said emulsion has a hydrophilic-lipophilic balance of from about 10.4 to about 10.8.

8. The process of claim 1 wherein said sugar surfactant and said nonionic surfactant are mixed in a percent by weight ratio of about 80:20, respectively, based on the weight of the emulsifier.

9. A process for the remediation of soil containing volatile organic compounds which comprises the steps of:
 (1) forming an emulsifier comprising:
  (a) about 80% by weight of an alkyl polyglycoside having the general formula I:

$$R_1O(R_2O)_b(Z)_a \qquad \text{I}$$

wherein $R_1$ is a monovalent organic radical having from 8 to 16 carbon atoms, b is zero, and a has a value of 1.55; and
  (b) about 20% by weight of a fatty alcohol having from about 12 to about 14 carbon atoms which, when combined with said alkyl polyglycoside, provides a hydrophilic-lipophilic balance of from 10.4 to 10.8;
 (2) mixing said emulsifier with said unwanted contaminants to form a stable emulsion; and
 (3) removing said stable emulsion from said soil.

10. A process for the remediation of soil containing volatile organic compounds which comprises the steps of:
 (1) forming an emulsifier comprising:
  (a) about 80% by weight of a glucamide having the general formula II:

$$\begin{array}{c} \text{O} \quad R_3 \\ \| \quad | \\ R_4-C-N-Y \end{array} \qquad \text{(II)}$$

wherein $R_3$ is H, $C_1$–$C_4$ hydrocarbyl, 2-hydroxy ethyl, 2-hydroxy propyl, or a mixture thereof; and $R_4$ is a $C_5$–$C_{31}$ hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof; and
  (b) about 20% by weight of a fatty alcohol having from about 12 to about 14 carbon atoms which, when combined with said alkyl polyglycoside, provides a hydrophilic-lipophilic balance of from 10.4 to 10.8;
 (2) mixing said emulsifier with said unwanted contaminants to form a stable emulsion; and
 (3) removing said stable emulsion from said soil.

11. A process for the remediation of soil containing volatile organic compounds which comprises the steps of:
 (1) forming an emulsifier comprising:
  (a) a sugar surfactant selected from the group consisting of an alkyl polyglycoside having the general formula I:

$$R_1O(R_2O)_b(Z)_a \qquad \text{I}$$

wherein $R_1$ is a monovalent organic radical having from about 6 to about 30 carbon atoms; $R_2$ is a divalent alkylene radical having from 2 to 4 carbon atoms; Z is a saccharide residue having 5 or 6 carbon atoms; b is a number having a value from 0 to about 12; a is a number having a value from 1 to about 6, a glucamide having the general formula II:

$$\begin{array}{c} \text{O} \quad R_3 \\ \| \quad | \\ R_4-C-N-Y \end{array} \qquad \text{(II)}$$

wherein $R_3$ is H, $C_1$–$C_4$ hydrocarbyl, 2-hydroxy ethyl, 2-hydroxy propyl, or a mixture thereof, and $R_4$ is a $C_5$–$C_{31}$ hydrocarbyl moiety, preferably straight chain $C_7$–$C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof, and mixtures thereof; and
  (b) a nonionic surfactant, other than said sugar surfactant which, when combined with said sugar surfactant, provides a hydrophilic-lipophilic balance of from about 8.0 to about 13.0;
 (2) mixing said emulsifier with said unwanted contaminants to form a stable emulsion; and
 (3) removing said stable emulsion from said soil.

12. The process of claim 1 wherein said sugar surfactant is said alkyl polyglycoside of formula I.

13. The process of claim 2 wherein in formula I of said alkyl polyglycoside, $R_1$ is a monovalent organic radical having from 8 to 16 carbon atoms, b is zero, and a has a value of 1.55.

14. The process of claim 1 wherein said sugar surfactant is said glucamide of formula II.

15. The process of claim 1 wherein said nonionic surfactant is selected from the group consisting of fatty alcohols having from about 12 to about 14 carbon atoms, monoglycerides, sorbitan monooleates, ethoxylated linear alcohols, block copolymers of propylene oxide and ethylene oxide, sorbitan trioleates, sorbitan tristearates, nonylphenol ethoxylates, sorbitan monostearates, POE (2) stearyl alcohol, POE (2) oleyl alcohol, diethylene glycol monooleate, diethylene glycol monostearate, methyl glucoside dioleate, glycerol monostearate, diethylene glycol monolaurate, tetraglyceryl monooleate, tetraglyceryl monostearate, polyethylene glycol oleyl ether, polyethylene glycol alkyl ether, sorbitan monopalmitate, and calcium dodecyl benzene sulfonate, and mixtures thereof.

16. The process of claim 5 wherein said nonionic surfactant is said fatty alcohols having from about 12 to about 14 carbon atoms.

17. The process of claim 1 wherein said emulsion has a hydrophilic-lipophilic balance of from about 10.4 to about 10.8.

18. The process of claim 1 wherein said sugar surfactant and said nonionic surfactant are mixed in a percent by weight ratio of about 80:20, respectively, based on the weight of the emulsifier.

19. A process for the remediation of soil containing volatile organic compounds which comprises the steps of:
 (1) forming an emulsifier comprising:

(a) an alkyl polyglycoside having the general formula I:

$$R_1O(R_2O)_b(Z)_a \qquad I$$

wherein $R_1$ is a monovalent organic radical having from 8 to 16 carbon atoms, b is zero, and a has a value of 1.55; and (b) a fatty alcohol having from about 12 to about 14 carbon atoms which, when combined with said alkyl polyglycoside, provides a hydrophilic-lipophilic balance of from 10.4 to 10.8;

(2) mixing said emulsifier with said unwanted contaminants to form a stable emulsion; and (3) removing said stable emulsion from said soil.

20. A process for the remediation of soil containing volatile organic compounds which comprises the steps of:

(1) forming an emulsifier comprising:

(a) a glucamide having the general formula II:

$$R_4-\overset{\overset{\displaystyle O}{\|}}{C}-\overset{\overset{\displaystyle R_3}{|}}{N}-Y \qquad (II)$$

wherein $R_3$ is H, $C_1-C_4$ hydrocarbyl, 2-hydroxy ethyl, 2-hydroxy propyl, or a mixture thereof, and $R_4$ is a $C_5-C_{31}$ hydrocarbyl moiety, preferably straight chain $C_7-C_{19}$ alkyl or alkenyl, or mixtures thereof; and Y is a polyhydroxyhydrocarbyl moiety having a linear hydrocarbyl chain with at least 3 hydroxyls directly connected to the chain, or an alkoxylated derivative thereof; and (b) a fatty alcohol having from about 12 to about 14 carbon atoms which, when combined with said alkyl polyglycoside, provides a hydrophilic-lipophilic balance of from 10.4 to 10.8;

(2) mixing said emulsifier with said unwanted contaminants to form a stable emulsion; and (3) removing said stable emulsion from said soil.

* * * * *